United States Patent Office 2,803,229
Patented Aug. 20, 1957

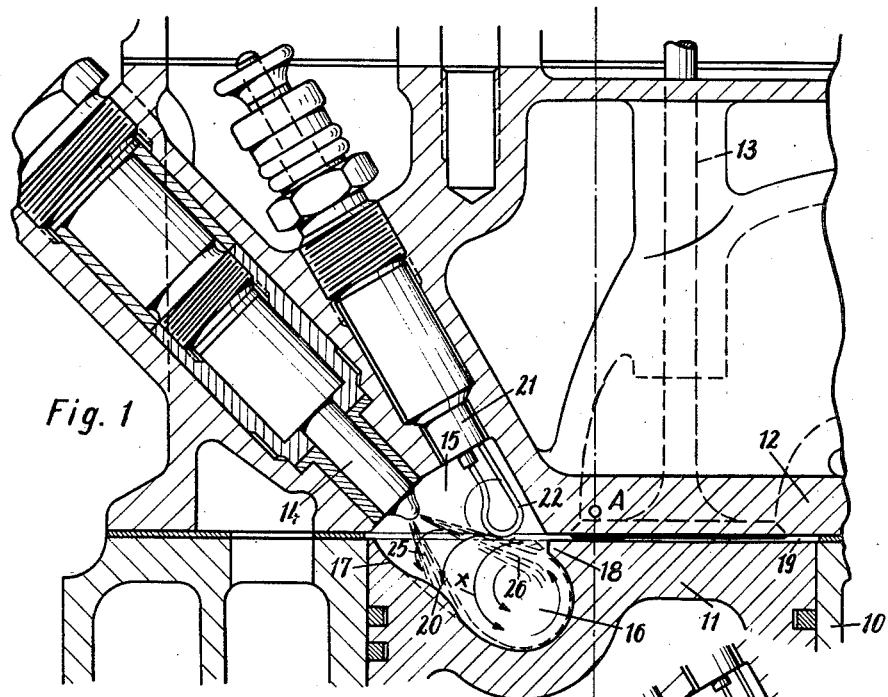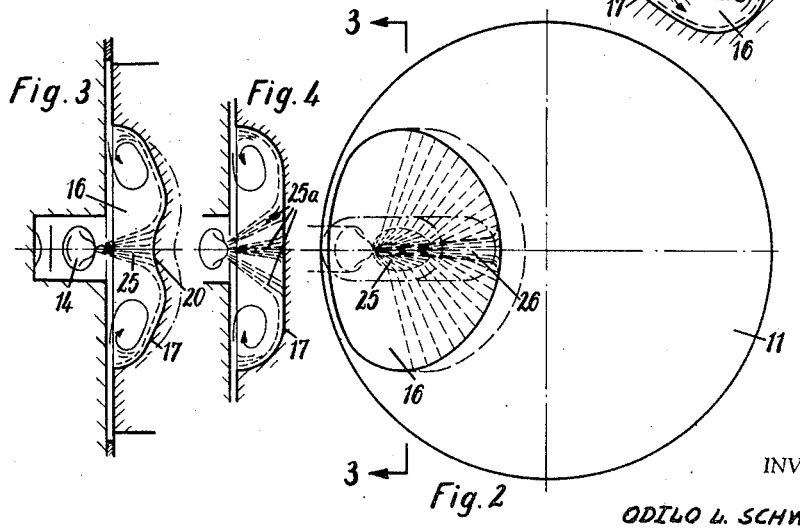

2,803,229

FUEL INJECTION ENGINE

Odilo L. Schwaiger, Stuttgart-Unterturkheim, Germany, assignor to Daimler-Benz Aktiengesellschaft, Stuttgart-Unterturkheim, Germany Application March 22, 1955, Serial No. 495,856

Claims priority, application Germany March 22, 1954

18 Claims. (Cl. 123—32)

The present invention relates to a fuel injection engine in which the combustion chamber into which the fuel is injected is preferably provided within the piston head and designed so as to give the air of combustion a turbulent flow while being compressed by the piston.

It is an object of the present invention to obtain a high engine output by more intimately vaporizing the fuel within the combustion chamber than was possible in previous engine designs of this type, and by mixing the fuel as uniformly as possible with the air of combustion.

An essential feature of the invention for accomplishing this object consists in an engine design in which at least a considerable portion of the fuel is injected so as to impinge upon the wall of the combustion chamber at a point which is spaced only a relatively small distance from the injection nozzle, and preferably in the direction of the turbulence of the air. By such novel construction it is possible to bring the fuel into contact with the turbulent air current in a finely atomized but still liquid state, and to have the fuel distributed in the form of a thin film, upon the wall of the combustion chamber from which it is then taken along by the combustion air, while another portion of the fuel is being injected into more remote parts of the combustion chamber, and possibly upon more remote parts of the wall of the combustion chamber, and preferably in a direction opposed or transverse to the movement of the combustion air.

Further objects of the invention are to provide a combustion chamber and its wall of a design and shape as smooth and uninterrupted as possible and one most suitable to cooperate with the particular type of fuel injection as previously mentioned.

Another feature of the invention for attaining the last-mentioned objects consists in arranging the fuel injection nozzle laterally of and inclined to the cylinder axis, and in such a manner that the turbulence chamber will extend into the piston head substantially in the same direction as the injection nozzle. For this purpose, the turbulence chamber is preferably shaped so that its wall at one side of the injection nozzle meets with the edge of the piston at an inclined angle, while at the opposite side and toward the center of the piston this wall forms a pocket-like chamber having a beaded or inwardly projecting edge. At least a portion of the fuel is then preferably injected so as to impinge upon the wall adjacent to the injection nozzle while at least another portion of the fuel impinges upon the opposite wall of the turbulence chamber.

Another object of the present invention is to provide a turbulence chamber of a design and shape permitting it to be milled by a cutter having an axis disposed substantially perpendicularly to the injection nozzle.

Further objects of the present invention are the provision of a highly advantageous fuel injection system in which the fuel may be injected in the form of several jets or in a single jet but of foglike or fanlike shape, and in a suitable arrangement of a glow plug so as to cooperate with the particular arrangement and design of the injection nozzle and combustion chamber.

Further objects, features, and advantages of the present invention will be apparent from the following detailed description of the invention and the accompanying drawing, in which Fig. 1 shows a vertical cross section through the combustion chamber and cylinder head of the engine;

Fig. 2 shows a top view upon the piston head;

Fig. 3 is a cross section taken along line 3—3 of Fig. 2;

Fig. 4 is another cross section taken along line 3—3 of Fig. 2 and showing a slight modification of the invention; while Fig. 5 is a detail view of a modified combustion chamber in a cross section similarly as shown in Fig. 1.

Referring to the drawings, and first particularly to Fig. 1, the piston 11 reciprocates in the usual manner in the cylinder 10, and is shown in Fig. 1 in its top dead-center or firing position. The water-cooled cylinder head 12 has provided therein an inlet and outlet valve 13 and adjacent each of them and inclined thereto an injection nozzle 14 which terminates in a recess 15 on the lower side of the cylinder head 12 and forming a part of the combustion chamber.

The combustion chamber is formed essentially of a turbulence chamber 16 which is provided in the piston head and extends principally coaxially to the injection nozzle 14 in such a manner that at the side of the injection nozzle the chamber 16 forms an upwardly inclined wall 17 which at its upper end merges into the upper edge of the piston, while at the opposite side the chamber 16 is shielded from the cylinder head 12 and the narrow space 19 intermediate the piston head and the cylinder head by a beadlike edge 18 projecting from the piston head.

As shown in Fig. 1 and for a purpose subsequently described, the wall 17 may also be provided with a smoothly rounded inward projection 20.

A glow plug 21 is mounted adjacent to the injection nozzle 14 so that the glow filament 22 extends into the recess 15 above the actual turbulence chamber 16.

The turbulence chamber 16 is preferably provided within the piston head of a design and shape permitting it to be easily milled out by means of a cutter. For this purpose, the cutter and piston 11 are preferably inclined relative to each other about a point A above the piston head near the projecting edge 18.

The fuel is injected into the combustion chamber in the form of two jets 25 and 26. Jet 25 is projected against the ascending wall 17 or the rounded projection 20 thereof so as to provide this wall with a thin coating or layer of fuel which because of the high temperature of the piston head quickly evaporates and is distributed in a vaporous state within the turbulence chamber 16 by the air flowing in the direction of the turbulence x. However, in order to supply an adequate supply of fuel also to the other parts of the combustion chamber, the second fuel jet 26 is projected from the injection nozzle 14 at an angle to the first jet 25 so as to pass through the air current streaming into the turbulence chamber in the direction x and impinging upon the projecting edge 18 of the piston head and the adjacent parts of the turbulence or combustion chamber.

As illustrated in Fig. 2, the second fuel jet 26 may be a relatively sharp, concentrated jet, whereas the first jet 25 preferably forms a relatively wide or open spray which is projected upon the wall 17 or the rounded projection 20 thereof in such a manner as to be distributed along the entire wall 17 like a veil or mist.

It has also been found to be of particular advantage if the concentrated jet 26 be directed to impinge upon a point or area where, as the result of the projecting edge 18 acting like a spillway, the air compressed by the piston head forms eddy currents, therefore mixing the air with the fuel still more intimately.

In this case, the combustion occurs primarily along the separating whirl or vortex adjacent to the projecting edge 18 causing the turbulence, that is, at a uniform and particular area upon which one or even several fuel jets may be directed either fan-shaped or in the same direction as the flow of the air current. It is also advisable that the amount of fuel injected into the turbulence chamber be controlled so as to obtain the best possible ratio to the amount of air available within the chamber.

Another important feature of the invention resides in the particular arrangement and location of the glow plug so that the glow filament 22 lies within the range of the jet which is injected essentially in opposition to the maximum turbulence so as to obtain the highest possible relative velocities and the least possible delays in ignition.

Despite the high turbulence within the combustion chamber, the latter is quite smooth and unobstructed so as to obtain the best possible prerequisites for a complete combustion. The particular troughlike shape of the combustion chamber in combination with the position of the injection nozzle and the direction of the fuel jet or jets relative to the surface of the chamber walls also has the advantage that the latter will be uniformly cooled by the impinging and evaporating fuel. The web between the valves is thermally protected since the combustion occurs principally at the side opposite to the valves and shielded by the projecting edge 18 of the piston head. The location of the injection nozzle 14 outside of the cylinder and combustion zones also protects the nozzle thermally and facilitates adequate cooling thereof.

The embodiment of the invention shown in Fig. 4 differs from that previously discussed by the design and shape of the wall 17 of the combustion or turbulence chamber insofar as this wall is made substantially flat and without the rounded projection 20. In order to obtain in such chamber an effect similar to that previously described with respect to Figs. 1 to 3, it is advisable that the fuel be sprayed upon the wall 17, for example, in three jets 25a so as to produce a turbulence within the combustion chamber substantially as indicated in Fig. 4.

In the embodiment shown in Fig. 5, however, the wall 17 is made slightly concave and the fuel is preferably injected into the combustion chamber 16 so as to form a single substantially coherent conical spray 27, which, however, is designed so that one part 27a thereof which preferably constitutes the main portion of the fuel impinges directly upon the wall 17 in a liquid condition, while the remainder 27b of the spray is distributed over the air space of the chamber.

The latter embodiment has the advantage that it only requires a simple nozzle with a pilot pin and producing a funnel-shaped spray, and that because of the partial fuel mixture both by evaporation along wall 17 as well as by the direct mixture with the compression air it is especially adapted for high-speed engines.

While I have described my invention with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A fuel injection engine comprising, in combination, an engine housing having a cylinder and a piston adapted to reciprocate in said cylinder, said housing, said cylinder, and said piston at the upper dead-center position thereof forming a combustion chamber having walls enclosing the same, means for imparting to the air in said combustion chamber a turbulence in one direction, an injection nozzle, means in said injection nozzle for spraying fuel so that one part thereof is sprayed upon a portion of the wall of the combustion chamber closely adjacent to said injection nozzle, and substantially in said one direction of turbulence of the air, while another part of the fuel is sprayed into more remote parts of the combustion chamber and substantially opposite to said one direction of turbulence of the air.

2. A fuel injection engine comprising a housing, having a cylinder therein, a cylinder head covering said cylinder, a piston adapted to reciprocate in said cylinder in the axial direction thereof and having a piston head, said piston head having a recess therein situated eccentrically to the axis of said piston, said recess being limited by the wall of said piston head and forming a combustion chamber designed so that the air compressed during the compression stroke of said piston is given by the shape of said chamber a turbulence in one direction, an injection nozzle, means in said injection nozzle for spraying fuel so that one part thereof is sprayed upon a portion of the wall of the combustion chamber closely adjacent to said injection nozzle, and substantially in said one direction of turbulence of the air, while another part of the fuel is sprayed into more remote parts of the combustion chamber and substantially opposite to said one direction of turbulence of the air.

3. A fuel injection engine according to claim 2, wherein said piston head includes a projection limiting said combustion chamber toward said cylinder head and located at the side of said combustion chamber at a lesser distance from the axis of said piston, and wherein said other part of the fuel is sprayed in the direction toward said projection.

4. A fuel injection engine according to claim 2, wherein said cylinder head is provided with a recess adjacent to said injection nozzle and constituting an extension of said combustion chamber in said piston when in the upper-dead center position, and a glow plug within said last-mentioned recess.

5. A fuel injection engine comprising a housing having a cylinder therein, a cylinder head covering said cylinder, a piston adapted to reciprocate in said cylinder in the axial direction thereof, said piston when in its upper dead-center position closely approaching said cylinder head, an injection nozzle in said cylinder head and mounted at an inclined position and eccentrically to the axis of said cylinder, said piston having a recess therein on the side thereof directed toward said injection nozzle and disposed eccentrically to said cylinder axis, said recess being limited at the side remote from said cylinder axis by a wall of said piston extending from the upper edge of said piston with an inclination toward the bottom of said recess, said recess being designed so that the air compressed during the compression stroke of said piston is given by the shape of said recess a turbulence in such a direction as to stream downwardly along said inclined wall toward the bottom of said recess, and means in said injection nozzle for injecting fuel upon said inclined wall substantially in the direction of the turbulence of the air.

6. A fuel injection engine according to claim 5 wherein said recess in said piston is disposed essentially semi-circularly about said injection nozzle on the side thereof nearer said cylinder axis as viewed in a plan view in the direction of the cylinder axis.

7. A fuel injection engine according to claim 6 wherein said inclined wall is provided with a projection against which the fuel is injected which enables the flow of the fuel in an essentially fan-shaped manner after impinging thereon.

8. A fuel injection engine according to claim 5, wherein said last-mentioned means in said injection nozzle is also operative to inject fuel into said recess in a direction essentially opposite to that of the turbulence of the air.

9. A fuel injection engine according to claim 8 wherein said cylinder head is provided with a recess adjacent to said injection nozzle and constituting an extension of said combustion chamber in said piston when in the upper dead center position thereof, and further comprising a glow plug within said last-mentioned recess.

10. A fuel injection engine comprising a housing having a cylinder therein, a cylinder head covering said cylinder, a piston adapted to reciprocate in said cylinder in the axial direction thereof, said piston having a piston head closely approaching said cylinder head in the top dead center position of said piston, an injection nozzle in said cylinder head disposed eccentrically to the cylinder axis and inclined at an angle thereto, said piston head being provided with a recess therein disposed eccentrically to said cylinder axis on the same side as said injection nozzle and to such an extent as to be located completely on one side of the piston axis, said recess being delimited by an inclined wall portion extending at an incline in the same general direction as said injection nozzle from a point near the outer edge of said piston head and merging into a circularly curved surface to form a turbulence chamber terminating in a projection on the upper part thereof located opposite said point with respect to said recess, whereby a well defined turbulence movement is imparted to the air between said piston head and said cylinder head and displaced by said piston head in the upper dead center position of said piston in the direction toward said wall portion where it is deflected into said turbulence chamber, said wall portion being provided with a projection extending in the direction of the axis of said recess, and means in said injection nozzle for injecting a first portion of the fuel over a relatively large surface against said last-mentioned projection and another portion thereof over a relatively small surface against said first-mentioned projection.

11. A fuel injection engine according to claim 10 wherein said cylinder head is provided with a recess adjacent to said injection nozzle and constituting an extension of said combustion chamber in said piston when in the upper dead center position thereof, and further comprising a glow plug within said last-mentioned recess.

12. A fuel injection engine comprising a housing having a cylinder therein, a cylinder head covering said cylinder, a piston adapted to reciprocate in said cylinder in the axial direction thereof and including a piston head, said piston head being provided with a recess therein limited by the wall of said piston head and forming a combustion chamber, an injection nozzle in said cylinder head with the axis thereof disposed in the direction of said recess, said nozzle including means for injecting fuel in said last-mentioned direction so that in the upper dead center position of said piston one part of the fuel is injected upon the wall of said piston head limiting said recess at a point closely adjacent to said injection nozzle, while another part of the fuel is injected into other parts of said combustion chamber more remote from said injection nozzle, said piston head including a projection limiting said compression chamber in the direction of said cylinder head and located on the side of said combustion chamber opposite said wall, said other part of the fuel being injected against said projection.

13. A fuel injection engine comprising a housing having a cylinder therein, a cylinder head covering said cylinder, a piston adapted to reciprocate in said cylinder in the axial direction thereof, said piston when in its upper dead-center position closely approaching said cylinder head, an injection nozzle in said cylinder head and mounted at an inclined position and eccentrically to the axis of said cylinder, said piston having a recess therein on the side thereof directed toward said injection nozzle and eccentrically to said cylinder axis, said recess being limited at the side remote from said cylinder axis by a wall of said piston extending from a point close to the edge of the piston at an inclination essentially in the same direction as the axis of said injection nozzle toward the inside of said piston, said recess being limited at the side thereof nearer said cylinder axis by a projection partially covering said combustion chamber relative to said cylinder head, so that the air compressed by said piston head is given a turbulent movement in said combustion chamber extending in the direction from said wall and along the bottom of the recess against said projection, said projection being located relative to said injection nozzle so that in the upper dead-center position of said piston said nozzle terminates near said wall, and means on said injection nozzle for injecting one part of the fuel upon said wall and another part substantially in the direction toward said bead-like projection.

14. A fuel injection engine according to claim 13, wherein said wall is provided with a projection upon which said first part of the fuel is sprayed.

15. A fuel injection engine according to claim 13, wherein said wall is slightly concave toward said combustion chamber.

16. A fuel injection engine according to claim 13, wherein said recess in said piston forming said combustion chamber constitutes a part of a body of rotation having an axis disposed substantially perpendicular to the axis of said injection nozzle.

17. A fuel injection engine according to claim 13, wherein said cylinder head is provided with a recess adjacent to said injection nozzle and constituting an extension of said combustion chamber in said piston when in the upper dead-center position, and a glow plug within said last recess.

18. A fuel injection engine according to claim 17, wherein, when said piston is in its upper dead-center position, the recess in said cylinder head with the glow plug therein is located adjacent to said beadlike projection on said piston head.

References Cited in the file of this patent

FOREIGN PATENTS

| | | |
|---|---|---|
| 425,200 | Italy | Sept. 13, 1947 |
| 942,735 | France | Sept. 20, 1948 |
| 865,683 | Germany | Feb. 5, 1953 |
| 296,779 | Switzerland | May 1, 1954 |

OTHER REFERENCES

A. P. C. application of Wiebicke, Serial No. 251,007; published May 11, 1943.